United States Patent Office 3,330,727
Patented July 11, 1967

3,330,727
GRISEOFULVIN WITH HIGH SPECIFIC SURFACE AREA
Kenneth Arthur Lees, Northwood England, assignor to Glaxo Laboratories Limited, Greenford, Middlesex, England, a British company
No Drawing. Continuation of application Ser. No. 103,224, Apr. 17, 1961. This application July 15, 1964, Ser. No. 382,923
6 Claims. (Cl. 167—65)

This application is a continuation of copending application Ser. No. 103,224, filed Apr. 17, 1961, now abandoned.

This invention is concerned with improvements in or relating to the antibiotic griseofulvin.

Griseofulvin has recently found considerable use in the treatment of various human and animal diseases. The substance is generally given by internal administration, particularly by mouth but may also be applied topically.

In the majority of preparations the griseofulvin is present in solid form and, for example, for oral administration, the antibiotic may be incorporated in a tablet, capsule or pill or be given in a suspension in some convenient liquid base.

My researches have shown that the uptake of griseofulvin into the blood stream following oral administration of solid griseofulvin is dependent upon the physical nature of the solid. I have thus found that by reducing the particle size of the solid to smaller dimension than the material hitherto used, the peak blood level following oral administration of a given dose is raised. The effect of raising the extent of uptake into the blood of a given dose of griseofulvin also has the important advantage that a detectable concentration is maintained in the blood for a longer period.

Investigation has thus shown that improved uptake of solid griseofulvin may be secured by preparing griseofulvin in particulate form having a specific surface area of at least $0.75 \times 10^4$ cm.$^2$/g.

Preferably also the solid griseofulvin should be in crystalline or micro-crystalline form, as distinct from amorphous form.

The invention accordingly comprises solid griseofulvin in particulate form, preferably in crystalline or micro-crystalline form, having a specific surface area of at least $0.75 \times 10^4$ cm.$^2$/g.

Whilst good results are obtained with solid griseofulvin having a specific surface area of at least $0.75 \times 10^4$ cm.$^2$/g., even better results are obtained by a further particle size reduction below $0.9 \times 10^4$ cm.$^2$/g., and better still below $1.2 \times 10^4$ cm.$^2$/g.

A still further improvement in absorption has been noted in some cases by reduction in particle size below 1.5 and in some cases $1.7 \times 10^4$ cm.$^2$/g.

The improved form of griseofulvin in accordance with the invention may be formulated for oral administration in any convenient form with the aid of suitable pharmaceutical carriers or excipients. Such preparations may be in solid form, for example, tablets, capsules, pills, dragees or other unitary form, or as powders or granules. For the production of such preparations, conventional carriers or excipients may be used as desired.

Orally administrable preparations may also be formulated in liquid form as suspensions or dispersions in a suitable carrier, which may be of an aqueous or oily nature. Such preparations may include other excipients such as suspending agents e.g. colloids, wetting agents, dispersing agents, sweetening agents or flavouring agents as desired.

The production of griseofulvin in small particle size in accordance with the invention may be achieved in various ways. A method of obtaining such material by direct crystallisation which has been found to be particularly convenient is described in Shaw et al. application Ser. No. 103, 343, filed Apr. 17, 1961. Griseofulvin of small particle size can also be obtained directly by the spray-drying of a solution of griseofulvin in a suitable solvent, e.g. chloroform or acetone, although the material so produced may be of an amorphous nature instead of the desired crystalline or mgicrocrystalline form. The spray dried material may comprise particles of the desired small particle size admixed with larger particles in which case classification of the particles to give a fraction of the desired size is necessary.

Alternatively, griseofulvin of large particle size obtained, for example, by the milling of griseofulvin produced by conventional techniques may be further size-reduced e.g. by passage through a suitable colloid mill or vibratory mill.

To illustrate the advantages of the improved form of griseofulvin according to the invention, a number of experiments were conducted in human volunteers to determine the average uptake of griseofulvin upon oral administration of tablets containing the antibiotic in different particle sizes.

For these experiments groups of six volunteers were asked to swallow either two or four tablets of the griseofulvin sample under test, each tablet containing 2.50 mg. of antibiotic.

The various forms of griseofulvin were thus tested at two dosages i.e. 0.5 g. and 1 g. Blood samples were taken by veni-puncture at 2, 4, 6, 8 and 26 hours and in some groups 50 hours after dosing, and were assayed in duplicate spectrophotofluorometrically. The results are shown in the following table:

TABLE

| Specific Surface Area | Dose, g. | Volunteer | Hours After Administration | | | | | |
|---|---|---|---|---|---|---|---|---|
| | | | 2 | 4 | 6 | 8 | 26 | 50 |
| $0.4 \times 10^4$ cm.$^2$/g | 0.5 | 1 | 0.4 | 0.7 | 0.7 | 0.6 | 0.1 | |
| | | 2 | *C | 0.5 | 0.5 | 0.3 | 0.2 | |
| | | 3 | 0 | 0.6 | 0.6 | 0.4 | 0.3 | |
| | | 4 | *C | 0.7 | 0.7 | 1.0 | 0.3 | |
| | | 5 | 0 | 0 | 0.3 | 0.3 | 0.2 | |
| | | 6 | 0.3 | 0.5 | 0.5 | 0.3 | 0.3 | |
| Average | | | 0.18 | 0.50 | 0.55 | 0.48 | 0.23 | |
| $0.8 \times 10^4$ cm.$^2$/g | 0.5 | 7 | 1.0 | 1.0 | 0.6 | 0.5 | 0.3 | |
| | | 8 | 0.7 | 1.2 | 1.2 | 1.0 | 0.5 | |
| | | 9 | 0.5 | 0.6 | 0.3 | 0.3 | 0 | |
| | | 10 | 1.0 | 0.8 | 0.6 | 0.5 | 0 | |
| | | 11 | 0.3 | 0.5 | 0.5 | 0.2 | 0 | |
| | | 12 | 0.7 | 1.2 | 1.1 | 0.8 | 0.6 | |
| Average | | | 0.70 | 0.88 | 0.71 | 0.56 | 0.23 | |

TABLE—Continued

| Specific Surface Area | Dose, g. | Volunteer | Hours After Administration | | | | | |
|---|---|---|---|---|---|---|---|---|
| | | | 2 | 4 | 6 | 8 | 26 | 50 |
| $0.4 \times 10^4$ cm.$^2$/g | 1 | 13 | 0.7 | 1.1 | 1.2 | 1.3 | 0.6 | |
| | | 14 | 0.7 | 0.8 | 0.6 | 0.5 | 0.4 | |
| | | 15 | 1.3 | 1.3 | 0.7 | 0.7 | 0 | |
| | | 16 | 0.7 | 1.0 | 0.7 | 0.8 | 0.6 | |
| | | 17 | 0.4 | 0.5 | 0.2 | 0.3 | 0 | |
| | | 18 | 1.0 | 1.3 | 0.8 | 0.8 | 0 | |
| Average | | | 0.80 | 1.00 | 0.70 | 0.73 | 0.27 | |
| $0.8 \times 10^4$ cm.$^2$/g | 1 | 19 | 0.8 | 1.5 | 0.4 | 1.0 | 0.3 | 0 |
| | | 20 | 0.5 | 0.7 | 0.9 | 1.2 | 0.4 | 0.5 |
| | | 21 | 0.3 | 1.5 | 1.9 | 1.8 | 0.9 | 0.5 |
| | | 22 | 0.4 | 1.2 | 1.4 | 1.7 | 0.8 | 0.6 |
| | | 23 | 1.8 | 2.2 | 2.3 | 2.1 | 0.7 | 0 |
| | | 24 | 0.8 | 0.5 | 0.7 | 0.8 | 0.8 | 0.4 |
| Average | | | 0.77 | 1.27 | 1.43 | 1.43 | 0.65 | 0.33 |
| $1.7 \times 10^4$ cm.$^2$/g | 0.5 | 25 | 0.6 | 1.1 | 1.1 | 1.0 | 0.4 | |
| | | 26 | 0.6 | 1.0 | 1.0 | 0.7 | 0.4 | |
| | | 27 | 0.6 | 0.9 | 0.9 | 0.9 | 0.2 | |
| | | 28 | 0.7 | 0.9 | 0.9 | 0.7 | 0.2 | |
| | | 29 | 0.3 | 1.0 | 0.8 | 0.8 | 0.2 | |
| | | 30 | 1.0 | 1.1 | 0.8 | 0.8 | 0.6 | |
| Average | | | 0.63 | 1.00 | 0.93 | 0.81 | 0.33 | |
| $1.1 \times 10^4$ cm.$^2$/g | 0.5 | 31 | 1.1 | 0.9 | 0.7 | 1.0 | 0.6 | |
| | | 32 | 0.2 | 0 | 0 | 0 | 0.2 | |
| | | 33 | 0.6 | 1.0 | 0.9 | 0.8 | 0.4 | |
| | | 34 | 0.4 | 0.6 | 0.9 | 1.1 | 0.4 | |
| | | 35 | 1.1 | 0.9 | 0.7 | 0.6 | 0.4 | |
| | | 36 | 0.4 | 0.5 | 0.7 | 0.5 | 0.4 | |
| Average | | | 0.63 | 0.65 | 0.65 | 0.67 | 0.40 | |
| $1.7 \times 10^4$ cm.$^2$/g | 1 | 37 | 1.2 | 1.5 | 1.1 | 1.3 | 0.8 | 0.4 |
| | | 38 | 1.3 | 2.1 | 1.8 | 2.1 | 1.8 | 1.3 |
| | | 39 | 0.8 | 1.2 | 1.1 | 1.1 | 1.0 | 0.3 |
| | | 40 | 1.2 | 1.6 | 1.3 | 1.3 | 0.6 | 0.3 |
| | | 41 | 0.6 | 1.4 | 1.7 | 2.2 | 1.2 | 0.4 |
| | | 42 | 0.9 | 1.2 | 1.0 | 1.2 | 0.7 | 0.2 |
| Average | | | 1.00 | 1.50 | 1.33 | 1.53 | 1.02 | 0.48 |
| $1.1 \times 10^4$ cm.$^2$/g | 1 | 43 | 0.9 | 1.1 | 1.0 | 0.8 | 0.6 | 0.2 |
| | | 44 | 1.9 | 1.5 | 1.4 | 1.0 | 0.3 | 0 |
| | | 45 | 1.2 | 1.4 | 1.3 | 1.2 | 0.8 | Absent |
| | | 46 | 1.3 | 1.5 | 1.2 | 1.0 | 0.7 | 0.2 |
| | | 47 | 0.9 | 2.1 | 2.1 | 1.9 | 0.8 | 0.3 |
| | | 48 | 0.5 | 0.4 | 0.4 | 0.5 | 0.9 | 0.3 |
| Average | | | 1.12 | 1.33 | 1.23 | 1.07 | 0.68 | 0.20 |

*C = Contaminated blood sample tube.

I now give by way of example only a description of a method of obtaining small particle size griseofulvin by the use of a vibratory mill.

A quantity of griseofulvin from a normal production batch with an approximate specific surface area of $0.4 \times 10^4$ cm.$^2$/g. is mixed with distilled water to produce a 40 percent slurry. The slurry is transferred to a suitable grinding container, consisting e.g., of a polyethylene jar or porcelain pot charged with grinding media to a level just below the surface of the slurry. The grinding media may consist of porcelain or marble balls, cylinders of ½" to 2" diameter prepared from sintered alumina or stainless steel balls or rods. The container holding the griseofulvin slurry and grinding charge is clamped to a vibratory grinding mill, with controlled amplitude of frequency of vibration allowed to operate for a period of time dependent on the specific surface area of the starting material and the product required. This period can vary from several hours to several days, and during the grinding period it may be necessary to add further small quantities of distilled water to the slurry to reduce viscosity as the particle size of the griseofulvin decreases. Samples are wtihdrawn from the slurry at intervals, vacuum dried and specific surface area determinations carried out, until the desired particle size is obtained. The slurry is then removed from the grinding mill diluted with distilled water and discharged into a Buchner funnel or porcelain filter fitted with a suitable filter paper. Vacuum is applied to remove the water. Recycling of the filtrate is employed to obtain maximum yield. Alternatively the slurry can be discharged into a suitable centrifuge. The grinding media and container are repeatedly rinsed with distilled water to obtain maximum yield. The wet cake is then removed from the filter or centrifuge and vacuum dried at room temperature to constant weight. The dried griseofulvin is then broken down by passing through a 40 mesh sieve.

Although a conventional rotary ball-mill may be used for wet milling the slurry, a greater charge and reduced grinding time can be obtained by using a vibratory mill with sintered alumina grinding media.

The following examples of suitable oral preparations of small particle size griseofulvin are given by way of illustration only:

In the formulation of the following preparations crystalline griseofulvin having a specific surface area of $1.56 \times 10^4$ cm.$^2$/g. is used, prepared by the process described in application Ser. No. 103,343 aforesaid.

*Example 1*

Tablets for oral use:                                   Mg.
   Griseofulvin (fine particle size) _____ 250
   Starch _____ 47
   Magnesium stearate _____ 3

The fine particle size griseofulvin is blended with most of the starch. The remaining starch is used in the form of a 10 percent starch paste as the granulating medium. The damp granules are passed through a No. 12 mesh sieve, dried under vacuum at a temperature not exceeding 25° C. and passed through a No. 16 mesh sieve. The magnesium stearate is blended with the dried granules which are then compressed at 300 mg. per tablet.

*Example 2*

Capsules:                                               Mg.
   Griseofulvin (fine particle size) _____ 250
   Fill into hard gelatine capsules, size 00.

Example 3

Aqueous suspension for oral use:

| | Percent, w./v. |
|---|---|
| Griseofulvin (fine particle size) | 5 |
| Sucrose | 50 |
| Sodium cyclamate | 0.3 |
| Saccharin sodium | 0.2 |
| Methyl parahydroxybenzoate | 0.15 |
| Lecithin | 1.0 |
| Methyl cellulose | 1.5 |
| Peppermint oil B.P. | 0.05 |
| Water to produce 100. | |

Dissolve the preservative in the available water, heated to 90° C. Add the sugar, and disperse the methyl cellulose in the hot solution by slowly sprinkling it onto the surface of the liquid, stirred by vortex action. When the sugar is dissolved, allow the mixture to stand overnight to cool and pass through an homogeniser. Absorb the peppermint oil into the griseofulvin powder and blend in the sweetening agents and lecithin. Make a thick slurry of the powders with some of the homogenised mixture and refine by passing through a colloid mill. Dilute the refined slurry with the remaining vehicle, make up to volume and mix well.

I claim:

1. A product consisting of crystalline griseofulvin in particulate form, said griseofulvin having a specific surface area of at least $0.75 \times 10^4$ cm.$^2$/g.

2. Griseofulvin as claimed in claim 1 having a specific surface area of at least $0.9 \times 10^4$ cm.$^2$/g.

3. Griseofulvin as claimed in claim 1 having a specific surface area of at least $1.2 \times 10^4$ cm.$^2$/g.

4. A pharmaceutical preparation comprising crystalline griseofulvin in the form of particles having a specific surface area of at least $0.75 \times 10^4$ cm.$^2$/g. and a pharmaceutical carrier, such preparation being adapted for oral administration.

5. A pharmaceutical tablet comprising crystalline griseofulvin in the form of particles having a specific surface area of at least $0.75 \times 10^4$ cm.$^2$/g. and at least one tabletting excipient.

6. A pharmaceutical capsule containing crystalline griseofulvin in the form of particles having a specific surface area of at least $0.75 \times 10^4$ cm.$^2$/g.

References Cited

FOREIGN PATENTS 795,039    5/1958    Great Britain.

OTHER REFERENCES

Aytoun: American Perfumer and Aromatics, vol. 74, pages 26–28.

Lyman et al.: American Pharmacy (Fourth Edition, 1955), pages 87 and 98.

MacMillan: J. Chem. Soc., London (1952), page 3955.

Martin: Husa's Pharmaceutical Dispensing, Fifth Edition (1959), pages 577–80 and 582.

Nelson: J. Amer. Pharm. Assoc., vol. 46 (1957) pages 607–14.

Remington: Practice of Pharmacy (Third Edition) (1895), page 179.

HENRY R. JILES, *Primary Examiner.*

NICHOLAS RIZZO, *Examiner.*

ALEX MAZEL, *Assistant Examiner.*

PO-1050
(5/69)

UNITED STATES PATENT OFFICE
CERTIFICATE OF CORRECTION

Patent No. 3,330,727         Dated July 11, 1967

Inventor(s)  Kenneth Arthur Lees

It is certified that error appears in the above-identified patent and that said Letters Patent are hereby corrected as shown below:

Column 1, between lines 9 and 10, insert

-- Claims priority, application Great Britain, April 19, 1960, No. 13725/60 --.

Signed and sealed this 14th day of January 1975.

(SEAL)
Attest:

McCOY M. GIBSON JR.
Attesting Officer

C. MARSHALL DANN
Commissioner of Patents